May 19, 1953
J. C. HEINTZ
2,638,629
TIRE MOLD
Filed Jan. 29, 1951
5 Sheets-Sheet 1
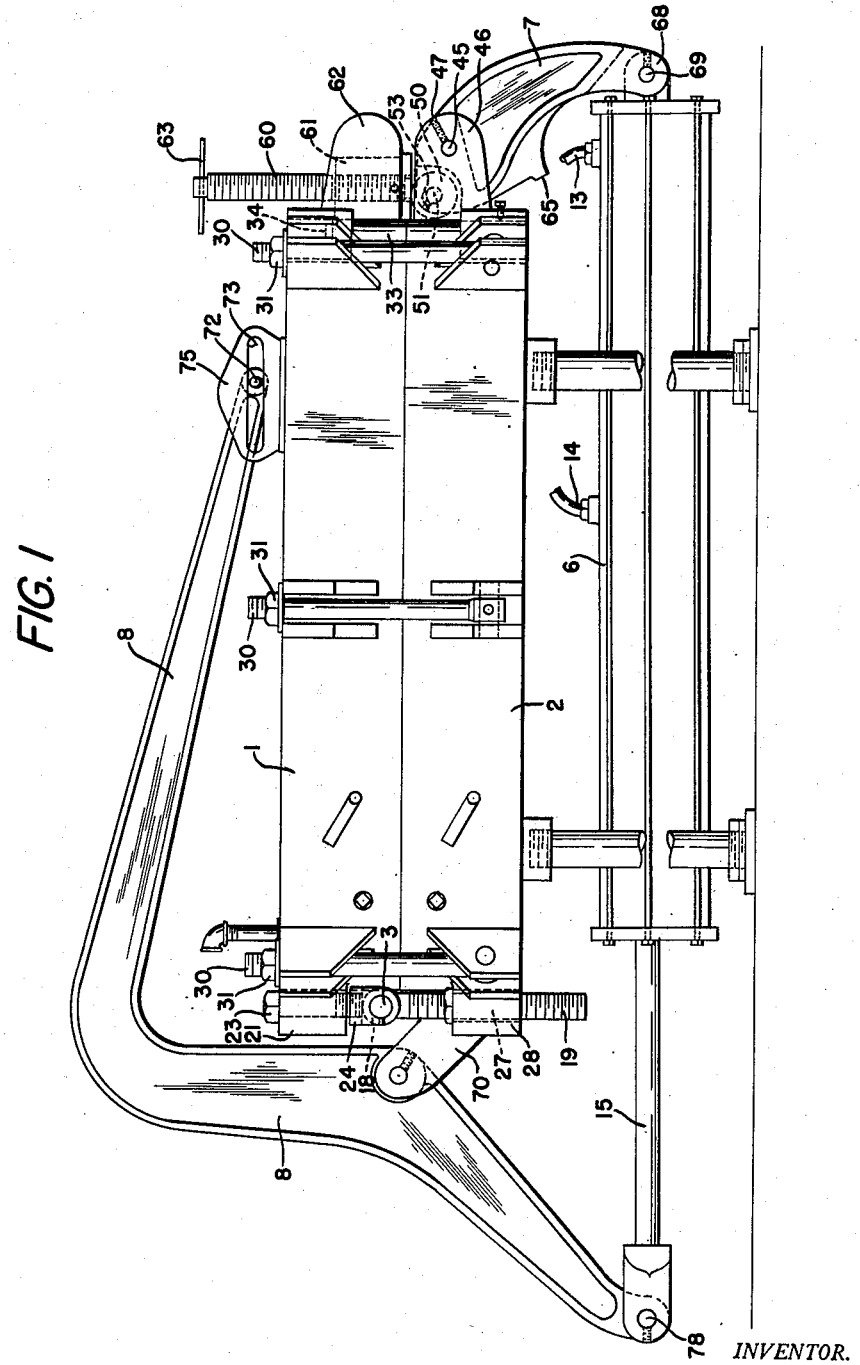
INVENTOR.
JAMES C. HEINTZ
BY
*Gordon C. Mack*
ATTORNEY

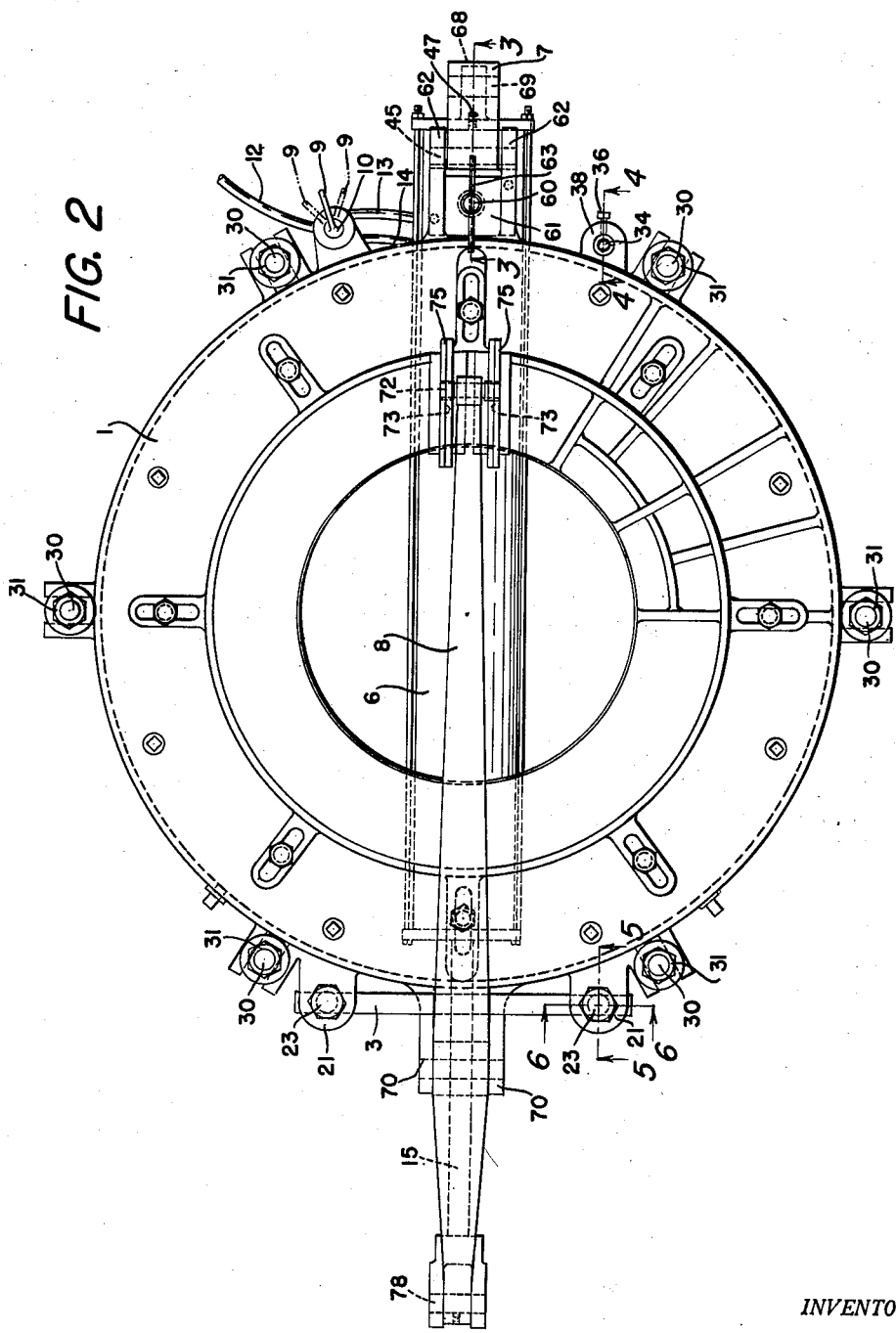

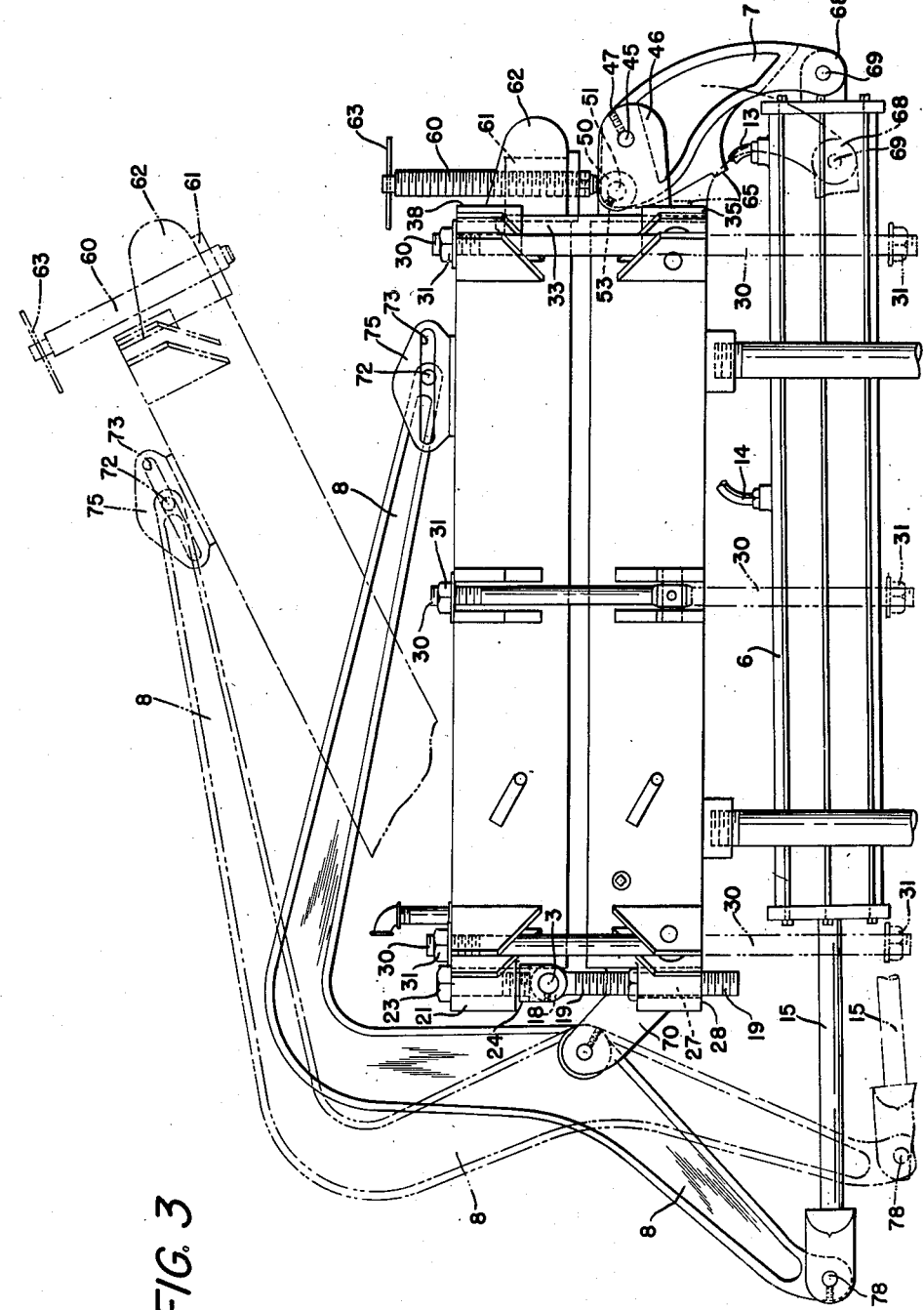

May 19, 1953 J. C. HEINTZ 2,638,629
TIRE MOLD
Filed Jan. 29, 1951 5 Sheets-Sheet 4
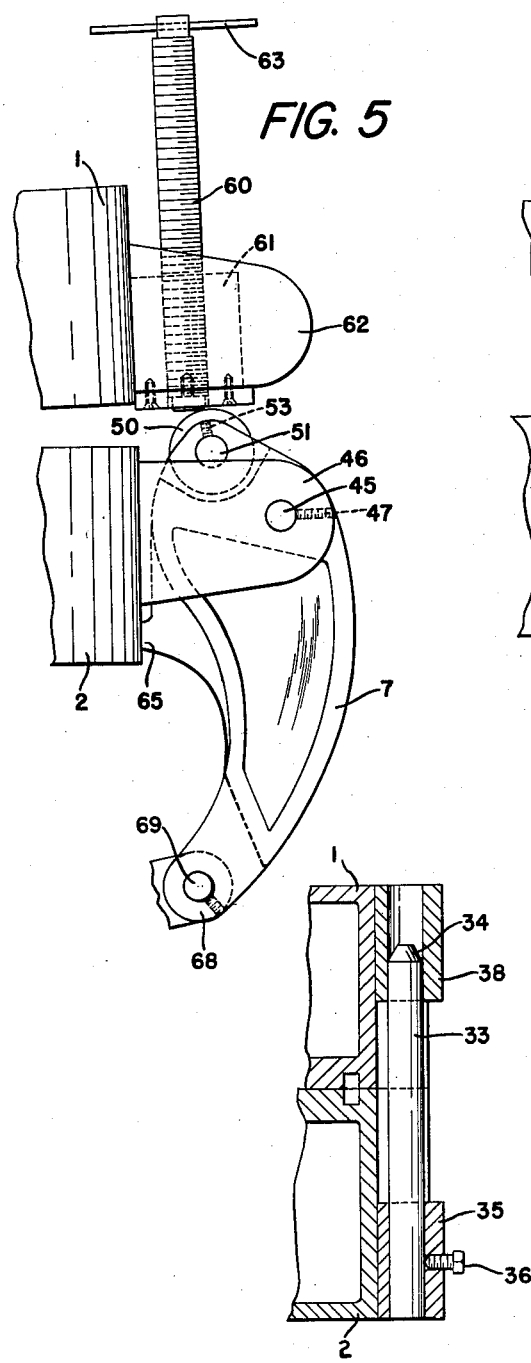
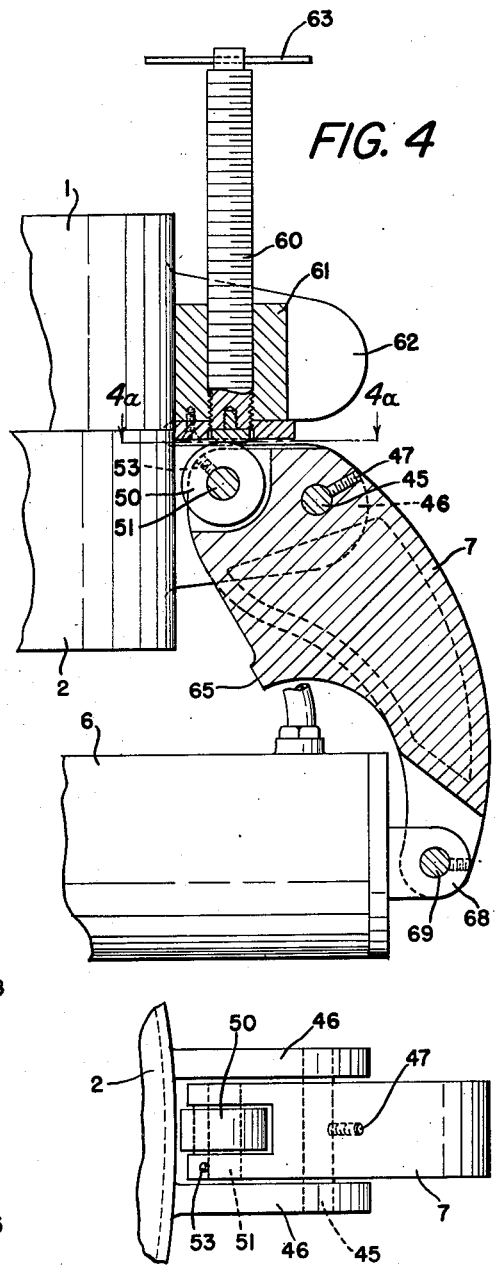
FIG. 5
FIG. 4
FIG. 4a
FIG. 9
INVENTOR.
JAMES C. HEINTZ
BY
ATTORNEY May 19, 1953   J. C. HEINTZ   2,638,629
TIRE MOLD Filed Jan. 29, 1951                                   5 Sheets-Sheet 5

INVENTOR.
JAMES C. HEINTZ
BY
ATTORNEY

Patented May 19, 1953

2,638,629

UNITED STATES PATENT OFFICE 2,638,629

TIRE MOLD

James C. Heintz, Lakewood, Ohio; the Cleveland Trust Company, executor of the said James C. Heintz, deceased Application January 29, 1951, Serial No. 208,337

1 Claim. (Cl. 18—18)

This invention relates to an improved hinge-type tire mold. Although more particularly designed for the retreading of tires, it may be used in the vulcanization of new tires.

One difficulty inherent in most or all hinged molds, more familiarly known as molds of the "watch-case" type, is the frequency with which the molds, near the hinge, pinch a tire, as the cover is being closed. This invention includes an improved self-adjusting hinge device which prevents this by permitting the portion of the upper platen of the mold near the hinge to lift as the mold is closed, so that the upper platen levels off and sinks gradually on to the tire in the mold.

The invention also includes a new breaker device to separate the platens after retreading a tire therein. The rubber adheres to the matrices during curing and the separation of the platens with release of the tire therefrom has been a problem in the industry. The improved means for accomplishing this, which is a feature of this invention, has proved most successful.

The invention includes a novel means for lifting the upper platen and lowering it. The connection of the lifting means with the upper platen is automatically adjustable for use on a platen which is to be raised from or lowered to different levels, according to the thickness of the tire being treated in the mold. The new lifting means is used in combination with the self-adjusting hinge and these are operated in combination with the breaker from a single cylinder. This combination is included as a part of the present invention.

The mold is designed to receive matrices of different thicknesses, and to operate equally well with matrices which are flush with the platen surfaces and matrices which stand out from the platen surfaces.

The improved hinge device may be described as a "floating" hinge. The pivot means is supported by a bushing which slides in holding means, so that the location of the pivot is adjusted automatically as the mold is being closed. This permits the rear of the lid to lift and level off, instead of closing on a tire and pinching it.

The invention will be further described in connection with the accompanying drawings, in which—

Fig. 1 is a view in elevation of the mold in closed position;

Fig. 2 is a plan view of the mold;

Fig. 3 is an elevation showing the mold adjusted to accommodate a large tire (omitting any showing of matrices between the platens), and showing in dotted lines the position of the upper platen, etc. when the mold is open;

Fig. 4 is a detail of the automatic breaker taken on the line 4—4 of Fig. 2;

Fig. 4A is a section on the line 4A—4A of Fig. 4;

Figure 8:
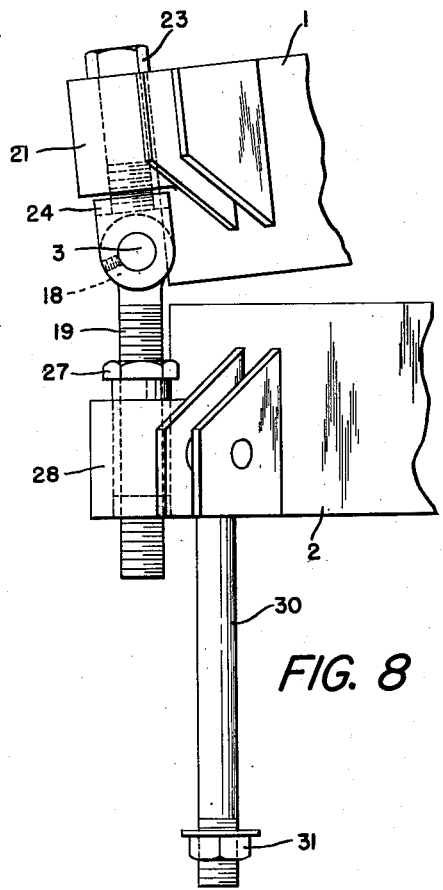
Figure 6:
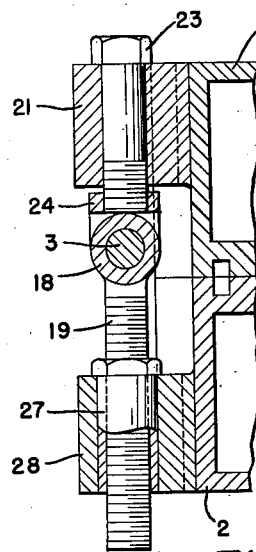
Figure 7:
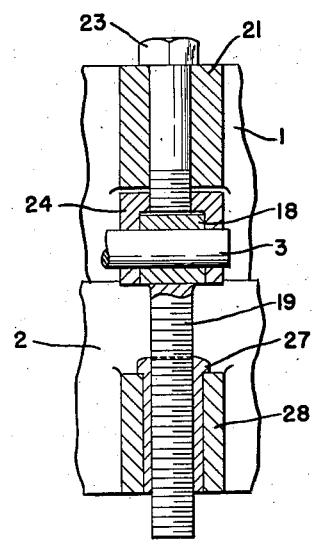

Fig. 5 corresponds to Fig. 4 but shows the position of the breaker after it has lifted the upper platen away from the lower platen;

Fig. 6 is a section through the hinge in closed position taken on the line 6—6 of Fig. 2;

Fig. 7 is a rear view of the hinge in the position shown in Fig. 6;

Fig. 8 is a detail showing the operation of the hinge as the mold closes; and

Fig. 9 is a section showing a detail of the aligning device taken on the line 9—9 of Fig. 2.

The mold includes the upper platen 1 and the stationary lower platen 2. The upper platen pivots about the shaft 3 which forms a part of the new hinge arrangement which will be described in detail in what follows. The operating mechanism includes the cylinder 6 which operates the breaker 7, and the hoisting arm 8. The piston in the cylinder may be any type of double-acting piston operated by either a gas or liquid under pressure.

The piston is operated by means of the handle 9 on the valve 10 supported by the bracket 11 fastened to the underside of the lower platen 2. The fluid—whether gas or liquid—enters the valve through the hose 12 and is sent to the piston either through the hose 13 or the hose 14. The cylinder illustrated is a compound cylinder. The left-hand end includes a closed oil chamber in which a valved piston operates. In the right-hand end is a conventional piston on the same piston rod 15 as the valved piston in the oil compartment. Air is introduced through the line 13 to force the piston rod 15 out of the cylinder and air is introduced through the line 14 to force the piston rod back into the cylinder. By providing a piston operating in the oil compartment, smooth operation is insured. The use of air for operating the piston does away with objectionable oil leakages, etc.

The hinge

The hinge pivots about the shaft 3. As best shown in Figs. 6 and 7, this shaft is held in two heads 18 on the threaded shanks 19, located on opposite sides of the rear of the mold. Each boss 21 of the upper platen 1 holds a bolt 23 which is threaded into the yoke 24 which pivots about one end of the shaft 3. A bushing 27 is threaded onto each shank 19. These bushings are slidably engaged in the bosses 28 on the lower platen 2. As shown in Fig. 8, each bushing 27 is adapted to slide vertically within its boss 28.

Figs. 6, 7 and 8 clearly illustrate the operation of the hinge when the mold is employed for vulcanizing a tire of the smallest size which the mold is adapted to treat. Figs. 6 and 7 show sectional side and rear views of the hinge when the mold is closed.

The hinge is adapted to level the upper platen to a parallel position at the critical point of closing the mold. In closing the conventional hinge-type molds the tire is apt to be pinched near the hinge, as the upper platen is closed onto the lower platen. When the mold of this invention is closed, instead of the platen closing on the rear squeezed portion of the tire, the hinge lifts by raising the bushing 27 in the bosses 28, as illustrated in Fig. 8, so as to fully accommodate the tire at the rear of the mold. As the upper platen closes down, its rear is gradually lifted until the platen assumes a horizontal position. The platen then sinks in this horizontal position until it comes to rest on the lower platen. The platens are finally drawn together by swinging the tightening bolts 30 into position and tightening the nuts 31.

Fig. 3 illustrates the mold closed on a thick tire, the matrices (not shown) used extending into the space between the platens, so that the upper platen cannot close flush on to the top of the lower platen. The bushings 27 being slidable in the bosses 28, the hinge is automatically raised to the required level. In order to support the hinge at this level, so that it will function properly when the top platen is swung up to give access to the interior of the mold, the bosses 27 are turned down on the shanks 19. They need not be positioned exactly, so long as they do not lift the hinge too high. When the top platen is closed on a tire, the rear of the platen will raise up, sliding the bushings 27 up in the bosses 28, so that the platen can level off and then sink horizontally down onto the tire, as previously explained.

The aligning device

The pin 33 helps to properly align the upper platen as it is closed on to the lower platen. The upper end 34 is conical, although preferably truncated. The pin is held in the boss 35 by the setscrew 36 so that the height of its top above the level of the lower platen can be adjusted. If the two platens do not come together (as in Fig. 3), the pin must be higher. If the upper platen closes flat on the lower platen (as in Fig. 1), the pin should be lower. The boss 38 on the upper platen is only slightly larger than the pin. In closing the upper platen this boss 38 is guided by the tapered surface 34 at the top of the pin, and the front of the upper platen is brought into correct alignment with the lower platen as this boss slides down over that portion of pin 33 which is of uniform diameter.

The automatic breaker

On completion of a cure the rubber adheres to the mold. It is difficult to separate the platens. The breaker 7 pivots about the pin 45 which is supported in the bosses 46, and is held against lateral movement by the setscrew 47. The roller 50 is held on the pin 51 in the cavity 52 in the upper part of the breaker 7 by the setscrew 53.

The roller operates against the bottom of the adjustable pin 60. This is threaded into the block 61 held between the bosses 62. It is provided at the top with the handle 63 to facilitate its adjustment. If the matrices are deep so that the platens do not close (Fig. 3), pin 60 is lowered to bring its lower end into operating range of the roller 50. If the platens close tight (Fig. 1), the pin is raised.

The boss 65 on the breaker 7 serves as a stop, when it is pressed against the lower platen.

The right end of the cylinder is pivotally fastened in the yoke 68 at the bottom of the breaker, by the pin 69.

The operation of the mold

The lifting arm 8 is pivotally supported in the bosses 70. Pin 72 held horizontally in its upper end slides in the slots 73 in the bracket 75 attached to the upper platen. The lower end of the arm is pivotally connected to the piston rod 15 by pivot 78.

To close the mold, the valve handle 9 is turned to introduce fluid into the right end of the cylinder 6 through hose 13. This expands the cylinder, lowers the lifting arm 8, and tilts the top of the breaker 7 toward the mold.

To open the mold, the fluid is introduced through the hose 14. This drives the piston into the cylinder. The tendency is to tilt the breaker away from the mold and raise the lifting arm. The distance of the pin 51 (supporting roller 50) to the pin 45 (on which the breaker pivots) is about one-fourth the distance from pivot 69 (at the bottom of the breaker) to the pin 45. This gives sufficient leverage to cause the breaker to operate before the lifting arm is raised.

As the breaker is pivoted away from the platen to the position shown in Fig. 5, the roller 50 presses up against the bottom of the pin 60, lifting the front of the upper platen sufficiently to tear the rubber bond so as to permit the platens to be separated. The movement of the breaker is stopped by the boss 65 coming against the lower platen. Then, as the piston rod is forced further into the cylinder, the bottom of the lifting arm is pulled in, and the top of the arm is raised. This opens the mold on the "floating hinge."

To close the mold on a tire, the valve handle is turned to force the fluid through hose 13. The piston is forced out of the cylinder. This swings the top of the breaker toward the mold, and lowers the lifting arm. The freedom of movement of the pin 72 in the slots in the bracket 75, permits the mold to close regardless of whether the platens are brought together (Fig. 1) or are separated by matrices (Fig. 3). As the upper platen closes down, if the tire tends to obstruct the space between the rear portion of the two platens, the hinge will rise up and the upper platen will level off as it is lowered, and then sink to rest in a horizontal position.

Thus the breaker, the lifting arm, and the hinge all function together, cooperating in the operation of the mold.

What I claim is:

A hinge-type tire mold formed with a permanently positioned bottom platen and an upper platen supported at the rear by a hinge permanently fastened thereto and vertically slidable in the lower platen, a hoisting arm pivoted at the rear of the mold with the front of its forward portion pivotally and slidably attached to the top of the upper platen forward of its center, a breaker pivoted at the front of the mold with a portion extending rearwardly from its said pivotal attachment and adapted to apply upward pressure to means in the front of the upper platen which is vertically adjustable with respect to the upper platen, and a pressure cylinder with a double-acting piston therein located betwen (1) a portion of the hoisting arm located below its said pivot attachment and (2) a portion of the breaker located below its said pivotal attachment and pivotally attached to each whereby when fluid is introduced into the cylinder against one surface of the piston so that the piston rod is forced out of the cylinder the front of the upper portion of the hoisting arm is lowered and the rearwardly extending portion of the breaker is lowered, and when fluid in introduced into the cylinder against the other surface of the piston and the piston rod is forced into the cylinder the rearwardly extending portion of the breaker is forced upward against the vertically adjustable means at the front of the mold and the front of the upper portion of the hoisting arm is lowered.

JAMES C. HEINTZ.

References Cited in the file of this patent

UNITED STATES PATENTS

| Number | Name | Date |
|---|---|---|
| 2,174,188 | Heintz | Sept. 26, 1939 |
| 2,255,770 | Glynn | Sept. 16, 1941 |
| 2,315,770 | Cleveland | Apr. 6, 1943 |
| 2,489,486 | Glynn | Nov. 29, 1949 |